(12) United States Patent
Lindmark et al.

(10) Patent No.: US 10,519,379 B2
(45) Date of Patent: Dec. 31, 2019

(54) BITUMEN PRODUCTION WITH SOLVENT RECOVERY SYSTEM HEAT EXCHANGE TECHNIQUES FOR BITUMEN FROTH TREATMENT OPERATIONS

(71) Applicant: FORT HILLS ENERGY L.P., Calgary (CA)

(72) Inventors: Jeffrey Lindmark, Calgary (CA); Jung Seob Kim, Seoul (KR); Gary Foulds, Calgary (CA)

(73) Assignee: FORT HILLS ENERGY L.P., Calgary (CA)

( * ) Notice: Subject to any disclaimer, the term of this patent is extended or adjusted under 35 U.S.C. 154(b) by 217 days.

(21) Appl. No.: 15/637,947

(22) Filed: Jun. 29, 2017

(65) Prior Publication Data

US 2018/0044594 A1 Feb. 15, 2018

(30) Foreign Application Priority Data

Aug. 11, 2016 (CA) .................................. 2,938,677

(51) Int. Cl.
| | |
|---|---|
| *C10C 3/00* | (2006.01) |
| *B01D 3/14* | (2006.01) |
| *C10G 1/04* | (2006.01) |
| *C10G 1/02* | (2006.01) |
| *F28D 9/00* | (2006.01) |
| *C08L 95/00* | (2006.01) |

(52) U.S. Cl.
CPC .............. *C10C 3/007* (2013.01); *B01D 3/143* (2013.01); *C10G 1/04* (2013.01); *F28D 9/00* (2013.01); *C08L 95/005* (2013.01); *C10G 1/02* (2013.01)

(58) Field of Classification Search
CPC .......... C10C 3/007; B01D 3/143; C10G 1/04; C10G 1/02; F28D 9/00; C08L 95/005
See application file for complete search history.

(56) References Cited

U.S. PATENT DOCUMENTS

| | | |
|---|---|---|
| 1,738,455 A | 12/1929 | Smith |
| 5,191,152 A | 3/1993 | Forte |

(Continued)

FOREIGN PATENT DOCUMENTS

| | | |
|---|---|---|
| CA | 2733332 C | 8/2012 |
| CA | 2737410 C | 10/2012 |

*Primary Examiner* — Randy Boyer
*Assistant Examiner* — Juan C Valencia
(74) *Attorney, Agent, or Firm* — Marshall, Gerstein & Borun LLP (57) ABSTRACT

Techniques are described for producing a bitumen product and recovering solvent from a solvent-diluted heavy hydrocarbon stream, which can have configurations and operation of an indirect heat exchanger to enhance performance. The system can have three solvent recovery stages. The indirect heat exchanger can have a location and operation to mitigate risks associated with exchanger failures. The solvent-diluted hydrocarbon stream can be preheated with a downstream solvent-depleted stream, and the pressure of the latter can be higher than that of the former to avoid solvent leaking into the hydrocarbon-enriched stream. The heat exchanger can be located in between the second and third stages, so that solvent leaked into the second stage output can be removed in the third stage so that the final product hydrocarbon stream can remain at low solvent contents.

22 Claims, 4 Drawing Sheets

(56) References Cited

U.S. PATENT DOCUMENTS

| | | |
|---|---|---|
| 7,785,399 B2 | 8/2010 | Huang et al. |
| 8,354,020 B2 | 1/2013 | Sharma et al. |
| 8,758,600 B2 | 6/2014 | Koseoglu et al. |
| 2013/0345485 A1 | 12/2013 | Duerr et al. |
| 2014/0083911 A1* | 3/2014 | Van Der Merwe .... C10G 21/28 208/390 |
| 2014/0291209 A1* | 10/2014 | Van Der Merwe .... C10G 1/047 208/390 |

* cited by examiner

BITUMEN PRODUCTION WITH SOLVENT RECOVERY SYSTEM HEAT EXCHANGE TECHNIQUES FOR BITUMEN FROTH TREATMENT OPERATIONS

TECHNICAL FIELD

The technical field generally relates to bitumen froth treatment operations and more particularly to solvent recovery techniques in such operations to produce bitumen or other hydrocarbon products.

BACKGROUND

Bitumen froth typically results from a primary separation of a slurry that includes water and oil sands ore. Bitumen froth treatment operations include a secondary separation, in which solvent (also referred to as diluent in some cases) is added to the bitumen froth for separation into a diluted bitumen stream and a tailings stream. The solvent can include paraffinic hydrocarbons (e.g., alkanes at varying ratios of linear alkanes and branched alkanes) for paraffinic froth treatment, but other froth treatment processes can use naphthenic diluent or other compounds. The solvent diluted bitumen (also called "dilbit") can have a high solvent content (e.g., 65% solvent by weight).

In a paraffinic bitumen froth treatment process, for example, bitumen froth derived from oil sands ore is combined with paraffinic solvent and then processed in a froth settling vessel in which the diluted bitumen overflow is separated from a bottoms fraction that includes bitumen asphaltenes, water, solvent and mineral solids as well as residual amounts of bitumen maltenes.

Before the diluted bitumen overflow can have the proper specifications for pipeline transportation, storage facilities or further processing in downstream processing facilities, solvent must be removed from the dilbit in a solvent recovery unit (SRU) to produce a bitumen stream and a recovered solvent stream. Conventional SRUs include stages for pre-heating the dilbit and separating the solvent from the dilbit. The bitumen product from the SRU has a very low solvent content (<5,000 ppm by weight) and the recovered solvent stream is recycled for use in the froth settling vessel.

One known approach for an SRU, such as disclosed in Canadian Patent No. 2,733,332, is to use one or more heat exchanger(s) to preheat the dilbit before solvent recovery. Hot downstream fluids from the final processing steps in the SRU, such as hot bitumen, can be used as heating media for this preheating.

SUMMARY

Various techniques are provided for recovering solvent from a solvent-diluted heavy hydrocarbon stream, such as a solvent-diluted bitumen stream, which can make use of certain configurations of separation units as well as certain operational features of an indirect heat exchanger to enhance performance.

In some implementations, there is provided a process for producing a bitumen product stream from a solvent-diluted bitumen stream resulting from solvent-assisted separation of a bitumen froth, the process comprising separating the solvent-diluted bitumen stream in a first stage flash vessel to produce a first stage flash vessel bottoms stream and a first stage recovered solvent stream; separating at least a portion of the first stage flash vessel bottoms stream in a second stage separation column to produce a bitumen component stream and a second stage recovered solvent stream; and separating the bitumen component stream in a third stage flash vessel to produce a bitumen product stream and a third stage recovered solvent stream.

In some implementations, there is provided a process for recovering solvent from a solvent-diluted bitumen stream resulting from solvent-assisted separation of a bitumen froth, the process comprising: separating the solvent-diluted bitumen stream in a first stage flash vessel to produce a first stage flash vessel bottoms stream and a first stage recovered solvent stream; separating at least a portion of the first stage flash vessel bottoms stream in a second stage separation column to produce a bitumen component stream and a second stage recovered solvent stream; and separating the bitumen component stream in a third stage flash vessel to produce a bitumen product stream and a third stage recovered solvent stream.

In some implementations, the process includes pre-heating the solvent-diluted bitumen stream before the first stage flash vessel to produce a heated diluted bitumen stream. In some implementations, the pre-heating is performed so as to heat the solvent-diluted bitumen stream up to between around 100° C. and around 140° C. In some implementations, the pre-heating comprises using at least a portion of the bitumen component stream as a heating stream in an indirect heat exchanger. In some implementations, the pre-heating comprises further heating the heated solvent-diluted bitumen stream in a direct-fired heater to produce a pre-heated solvent-diluted bitumen stream.

In some implementations, the process includes operating the second stage separation column to produce the bitumen component stream at a temperature between about 190° C. and about 250° C.

In some implementations, the process includes cooling the bitumen product stream before the third stage flash vessel to produce a cooled bitumen product stream.

In some implementations, the cooling is performed so as to cool the bitumen component stream from between about 190° C. and 250° C. down to between about 90° C. and 150° C. In some implementations, the cooling comprises using the solvent-diluted bitumen stream as a cooling stream in an indirect heat exchanger.

In some implementations, the process includes providing the bitumen component stream at a higher pressure relative to a pressure of the solvent-diluted bitumen stream in the indirect heat exchanger.

In some implementations, the higher pressure is sufficiently higher so that any leak in between the bitumen component stream and the solvent-diluted bitumen stream in the indirect heat exchanger results in the bitumen component stream leaking into the solvent-diluted bitumen stream.

In some implementations, rein providing the bitumen component stream at the higher pressure than the solvent-diluted bitumen stream, comprises pressurizing the bitumen component stream above the pressure of the solvent-diluted bitumen stream. In some implementations, the pressurizing is performed by pumping the bitumen component stream using at least one pump upstream of the indirect heat exchanger. In some implementations, the bitumen component stream is provided between an absolute pressure of 100 kPa (i.e., 100 kPaa) and 1000 kPaa above the pressure of the solvent-diluted bitumen stream in the indirect heat exchanger.

In some implementations, the indirect heat exchanger is a shell and tube heat exchanger, the shell and tube heat exchanger having a shell side in which the bitumen component stream flows and a tube side in which the solvent-diluted bitumen stream flows.

In some implementations, the separation of the bitumen component stream in the third stage flash vessel is operated at a vacuum pressure less than atmospheric pressure.

In some implementations, the process includes monitoring a third stage pressure in the third stage flash vessel for a pressure increase due to the vaporization of an increased amount of solvent in the bitumen component stream.

In some implementations, the process includes further preventing the bitumen product stream from being sent to downstream storage facilities, pipeline or processing facilities if the increase of pressure is monitored within the third stage flash vessel.

In some implementations, the solvent comprises a naphthenic solvent or a paraffinic solvent. In some implementations, the paraffinic solvent comprises alkanes with a number of carbon atoms between 4 and 7.

In some implementations, a solvent-to-bitumen weight ratio of the solvent-diluted bitumen stream is between about 1.5 and about 2. In some implementations, a solvent-to-bitumen weight ratio of the first stage flash vessel bottoms stream is between about 0.01 and about 0.5. In some implementations, the solvent-to-bitumen weight ratio of the first stage flash vessel bottoms stream is between about 0.15 and about 0.25.

In some implementations, a solvent-to-bitumen weight ratio of the second stage separation column bottoms stream is sufficiently low to maintain a maximum pressure in the third stage vessel between 70 kPaa and 90 kPaa.

In some implementations, the first stage flash vessel and the third stage flash vessel are flash drums. In some implementations, the first stage flash vessel, the second stage separation column and/or the third stage vessel comprises a plurality of vessels which are configured in series or parallel. In some implementations, the first stage flash vessel, the second stage separation column and the third stage vessel each comprise a single vessel. In some implementations, the second stage separation column is configured and operated so that the second recovered solvent stream contains substantially no bitumen. In some implementations, the process includes injecting steam in the second stage separation column to facilitate solvent separation. In some implementations, the process includes injecting steam into the portion of the first stage flash vessel bottoms stream fed into the second stage separation column, to facilitate solvent separation.

In some implementations, there is provided a process for producing a bitumen product stream from a solvent-diluted heavy hydrocarbon stream, the process comprising: pre-heating the solvent-diluted heavy hydrocarbon stream with a heating stream in an indirect heat exchanger to produce a preheated solvent-diluted heavy hydrocarbon stream; separating the preheated solvent-diluted heavy hydrocarbon stream in a solvent-heavy hydrocarbon separation unit to produce a recovered solvent stream and a heated liquid component stream; reusing at least a portion of the heated liquid component stream as the heating medium for the pre-heating step to produce a cooled liquid component stream; providing the heated liquid component stream at a higher pressure relative to a pressure of the solvent-diluted hydrocarbon stream in the indirect heat exchanger to prevent the solvent-diluted heavy hydrocarbon stream from flowing into the heated liquid stream via a leak; and deriving the bitumen product stream from the cooled liquid component stream.

In some implementations, there is provided a heat integration process for recovering solvent from a solvent-diluted heavy hydrocarbon stream, the process comprising: pre-heating the solvent-diluted heavy hydrocarbon stream with a heating stream in an indirect heat exchanger to produce a preheated solvent-diluted heavy hydrocarbon stream; separating the preheated solvent-diluted heavy hydrocarbon stream in a solvent-heavy hydrocarbon separation unit to produce a recovered solvent stream and a heated liquid component stream; reusing at least a portion of the heated liquid component stream as the heating medium for the pre-heating step to produce a cooled liquid component stream; and providing the heated liquid component stream at a higher pressure relative to a pressure of the solvent-diluted hydrocarbon stream in the indirect heat exchanger to prevent the solvent-diluted heavy hydrocarbon stream from flowing into the heated liquid stream via a leak.

In some implementations, the solvent-heavy hydrocarbon separation unit comprises a first stage flash drum and a second stage separation column.

In some implementations, the process includes separating the cooled liquid component stream in a supplementary solvent-heavy hydrocarbon separation unit to produce a liquid product stream and an additional solvent stream. In some implementations, the supplementary solvent-heavy hydrocarbon separation unit comprises a third stage flash drum.

In some implementations, the process includes monitoring a pressure in the supplementary solvent-heavy hydrocarbon separation unit for detecting an increase of pressure due to an increased solvent content in the cooled liquid component stream. In some implementations, the pressure monitoring comprises sensing the pressure in the supplementary solvent-heavy hydrocarbon separation unit with a pressure transducer. In some implementations, the pressure monitoring further comprises providing the sensed pressure to a controller if the sensed pressure reaches a pressure threshold. In some implementations, the pressure threshold is set by vapour pressure requirements of downstream storage facilities, pipeline or processing facilities vapour pressure requirements. In some implementations, the pressure threshold is between about 70 kPaa and about 90 kPaa.

In some implementations, the process includes preventing the cooled liquid component stream from automatically proceeding to the downstream storage facilities, pipeline or processing facilities, if the sensed pressure is above the pressure threshold. In some implementations, the preventing comprises actuating a valve downstream of the supplementary solvent-heavy hydrocarbon separation unit.

In some implementations, the process includes diverting the cooled liquid component stream back into an upstream unit.

In some implementations, the solvent-diluted stream is derived from a solvent-assisted separation of a bitumen froth during oil sands ore extraction operations. In some implementations, the solvent comprises a naphthenic solvent or a paraffinic solvent.

In some implementations, there is provided a process for separating a solvent-diluted hydrocarbon stream to produce recovered solvent vapour and liquid hydrocarbon product, the process comprising: feeding the solvent-diluted hydrocarbon stream into a solvent-hydrocarbon separation unit to produce a solvent vapour stream and a liquid component stream; pre-heating the solvent-diluted hydrocarbon stream in an indirect heat exchanger located upstream of the solvent-hydrocarbon separation unit using the liquid component stream and producing a cooled liquid component stream; providing a supplementary solvent-hydrocarbon separation unit downstream of the indirect heat exchanger to receive the cooled liquid component stream and produce a liquid hydrocarbon product stream; and monitoring operation of the supplementary solvent-hydrocarbon separation unit to detect a potential leak from the solvent-diluted hydrocarbon stream into the liquid component stream in the indirect heat exchanger.

In some implementations, there is provided a heat integration process for separating a solvent-diluted hydrocarbon stream to produce recovered solvent vapour and liquid hydrocarbon product, the process comprising: feeding the solvent-diluted hydrocarbon stream into a solvent-hydrocarbon separation unit to produce a solvent vapour stream and a liquid component stream; pre-heating the solvent-diluted hydrocarbon stream in an indirect heat exchanger located upstream of the solvent-hydrocarbon separation unit using the liquid component stream and producing a cooled liquid component stream; providing a supplementary solvent-hydrocarbon separation unit downstream of the indirect heat exchanger to receive the cooled liquid component stream and produce a liquid product stream; and monitoring operation of the supplementary solvent-hydrocarbon separation unit to detect a potential leak from the solvent-diluted hydrocarbon stream into the liquid component stream in the indirect heat exchanger.

In some implementations, the monitoring operation of the supplementary solvent-hydrocarbon separation unit comprises monitoring an operating pressure thereof, and wherein the leak is detected when detecting an increase of the operating pressure above a pressure threshold.

In some implementations, the monitoring operation of the supplementary solvent-hydrocarbon separation unit comprises monitoring an in-line residual solvent-in-bitumen ratio of the liquid component stream.

In some implementations, an in-line analyzer is used to monitor the residual solvent-in-bitumen ratio.

In some implementations, the leak is detected when the in-line residual solvent-in-bitumen ratio is above a residual solvent-in-bitumen ratio threshold.

In some implementations, the supplementary solvent-hydrocarbon separation unit is operated under vacuum pressure less than atmospheric pressure, and wherein the monitoring operation of the supplementary solvent-hydrocarbon separation unit comprises monitoring a vacuum pumping load of a vacuum system operatively coupled to the supplementary solvent-bitumen separation unit, wherein the leak is detected when detecting an increase in the vacuum pumping load of the vacuum system above a load threshold.

In some implementations, the process includes preventing the liquid component stream from automatically proceeding to downstream storage facilities, pipeline or processing facilities, if the potential leak is detected.

In some implementations, the solvent-diluted heavy hydrocarbon stream is derived from a solvent-assisted separation of a bitumen froth during oil sands ore extraction operations.

It should also be noted that various features of the processes and systems described above and herein may be combined with other features and aspects of the processes and systems. The techniques can exhibit one or more of the following advantages: mitigating risks associated with indirect heat exchanger leaks, which may be due to tube failures; mitigating risks associated with contaminating bitumen product streams with solvent; facilitating removal of trace amounts of solvents while enabling monitoring of solvent content; enabling heat integration between various units used in the solvent recovery operation and thus reduce heat losses; and facilitating efficient and reliable solvent recovery from solvent diluted bitumen to produce a product that meets pipeline and storage criteria.

DETAILED DESCRIPTION

Various techniques are described for solvent recovery from diluted heavy hydrocarbons, such as diluted bitumen that is derived from a bitumen froth separation unit (FSU). The solvent recovery unit (SRU), which can include a certain configuration of separation vessels as well as a certain indirect heat exchange setup, will be described in further detail below.

Three-Stage Solvent Recovery Process

In some implementations, the techniques for recovering solvent from a solvent-diluted hydrocarbon stream are based on a three-stage solvent recovery unit (SRU). In some implementations, the solvent-diluted hydrocarbon stream is derived from a solvent-assisted separation of bitumen froth during oil sands ore extraction operations.

It should be understood that many aspects of the techniques described herein in relation to streams including hydrocarbons in general can also be applied to heavy hydrocarbon streams or bitumen streams in particular, and vice-versa. For example, the solvent-diluted stream may be referred to as a solvent-diluted hydrocarbon stream, a solvent-diluted heavy hydrocarbon stream or a solvent-diluted bitumen stream. Another example is that the liquid component stream may also be referred to as a hydrocarbon component stream, a heavy hydrocarbon component stream or a bitumen component stream. In addition, depending on the nature of the hydrocarbons, the nature of the solvent (also referred to as diluent) used to dilute the hydrocarbon stream may vary and may be selected from paraffinic solvents, naphthenic solvents or other appropriate solvents.

Figure 1:
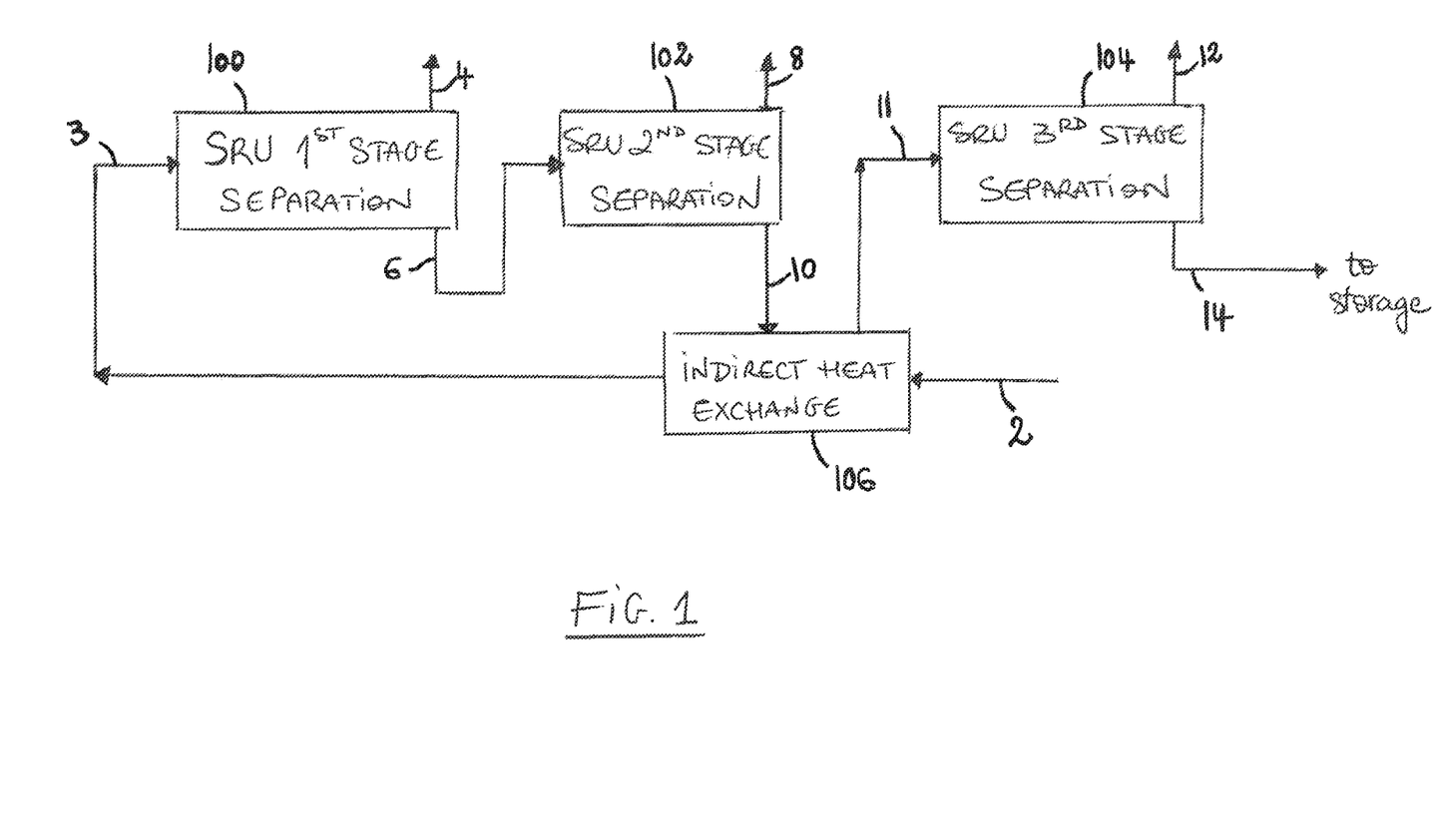
FIG. 1 is a diagram of a solvent recovery unit (SRU) including three separation stages.

In the implementation illustrated in FIG. 1, the recovery process includes an SRU first stage separation step 100 in which a solvent-diluted bitumen stream 2 is separated to produce a first stage recovered solvent stream 4 and a first stage bottoms stream 6. The process further includes an SRU second stage separation step 102 in which the first stage bottoms stream 6 is separated again to produce a second stage recovered solvent stream 8 and a bitumen component stream 10. The process further includes an SRU third stage separation step 104 in which the bitumen component stream 10 is separated to produce a third stage recovered solvent stream 12 and a bitumen product stream 14. The bitumen product stream 14 may be sent to storage facilities including storage tanks, through pipeline transportation or for further processing in downstream processing facilities.

In some implementations, the first stage separation step 100 may be designed to greatly reduce the solvent content of the solvent-diluted bitumen stream at elevated temperature and pressure conditions. For example, in situations where the solvent-diluted bitumen stream has a high solvent content (e.g. a solvent-to-bitumen weight ratio between about 1.5 and about 2), the resulting first stage bitumen-enriched bottoms stream may have a solvent-to-bitumen weight ratio between about 0.01 and about 0.5 or between about 0.15 and about 0.25. The solvent-diluted bitumen stream's solvent-to-bitumen weight ratio depends on the type of solvent used in the upstream FSU and the operating parameters. The solvent-to-bitumen weight ratio of the first stage bitumen-enriched bottoms stream 6 strongly depends on the solvent-to-bitumen weight ratio of the solvent-diluted bitumen stream 3, the type of solvent used, and the pressure of the first stage separation vessel. The first stage separation vessel can thus be designed and operated to remove a substantial amount of the solvent, although the resulting bitumen-enriched bottoms stream still includes solvent that requires removal.

Figure 2:
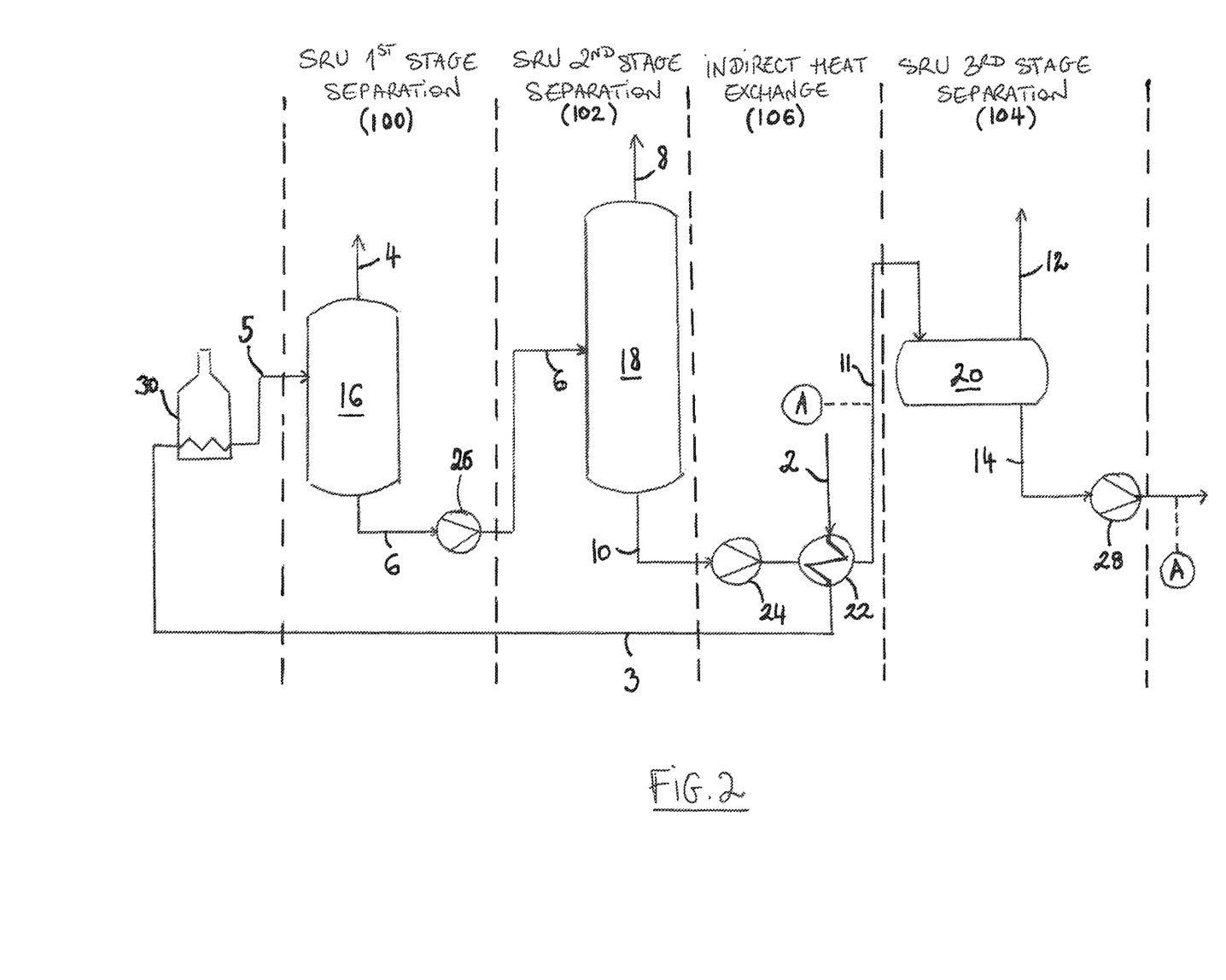
FIG. 2 is a flow diagram of an SRU including three separation stages.

Referring to FIG. 2, the first stage separation step 100 may be performed in a first stage flash vessel 16, such as a first stage flash drum, which can be operated as a vertical or horizontal vessel. It should be understood that the first stage separation stage may include multiple flash vessels that can be operated in parallel or in series. The number of vessels can be selected according to the solvent content of the solvent-diluted hydrocarbon stream.

In some implementations, the second stage separation step 102 may be designed to further separate solvent from the first stage bottoms stream 6 which has a much lower solvent content than the solvent-diluted bitumen stream 2. The bitumen component stream 10 resulting from the second stage separation step 102 may therefore only include trace amounts of solvent. The second recovered solvent stream 8 may contain substantially no bitumen.

Referring still to FIG. 2, the second stage separation step 102 may be performed in a second stage separation column 18. The second stage separation column 18 may also be referred to herein as a second solvent-bitumen separation unit for some implementations. It can also be referred to as a second solvent-heavy hydrocarbon separation unit or second gas-liquid separation unit of for some implementations. There may be a pre-heater (not illustrated) for heating the feed 6 supplied to the column 18. The column 18 may include trays, the number of which may be selected to maximize separation of the solvent from the first stage bottoms stream 6. In some implementations, the second stage separation column 18 may also be designed such that negligible amounts of bitumen carry over into the second recovered solvent stream 8. Optionally, the process may include injecting steam or another stripping fluid into the second stage separation column 18 to facilitate solvent separation.

In the implementation still illustrated in FIG. 2, the third stage separation step 104 can facilitate removal of remaining trace amounts of solvent from the bitumen component stream and can also serve as part of a monitoring step related to solvent content. For example, the third stage separation step 104 may be performed in a third stage flash vessel 20, such as a flash drum, that can be operated so as to detect abnormally high solvent content in the bitumen component stream 11, such as solvent levels that would render the bitumen product stream 14 unsuitable for pipeline transportation, storage facilities or further processing in downstream processing facilities. More regarding the monitoring will be discussed further below.

Heat Integration with Indirect Heat Exchanger

Heat integration can be used to reduce energy costs of the solvent recovery process, especially regarding process stream heating. In some implementations, the solvent recovery process may include pre-heating the solvent-diluted hydrocarbon stream with a heating stream to produce a preheated solvent-diluted hydrocarbon stream for the first stage separation step.

For example, referring to FIG. 1, the solvent-diluted hydrocarbon stream 2 can be heated upstream of the first stage separation step 100 so as to produce a pre-heated solvent-diluted hydrocarbon stream 3. Optionally, at least a portion of the heat used during the second stage separation step 102 can be reused by employing at least part of the produced hot hydrocarbon component stream 10 as a heating stream.

In some implementations, at least a portion of the hydrocarbon component stream may be used as the heating stream to pre-heat the solvent-diluted hydrocarbon stream in an indirect heat exchanger.

Some implementations of the indirect heat exchanger will now be discussed. Referring to FIG. 2, the second solvent-bitumen separation unit 18 produces a recovered solvent stream 8 and a heated liquid stream 10. As above-mentioned, the proposed recovery techniques can include reusing the heated liquid stream 10 as the heating medium (or stream) to pre-heat the solvent-diluted stream 2 in an indirect heat exchanger 22. Therefore, the heat integration process also enables advantageous cooling of the liquid stream 10 to produce a cooled liquid stream 11 before entering the third stage flash vessel 20.

The indirect heat exchanger can offer an adequate solution to perform the heat exchange, as the heated liquid stream is not mixed with the solvent-diluted stream. The produced cooled liquid stream has therefore the same composition and can be further treated or stored without modification.

In some implementations, in case of solvent recovery from a solvent-diluted bitumen stream 2, the pre-heating may be performed so as to heat the solvent-diluted bitumen stream 2 up to a temperature between around 100° C. and around 140° C. In addition, the cooling may be performed so as to cool the bitumen component stream 10 from between 190° C. and 250° C. down to between 90° C. and 150° C.

In some implementations, the indirect heat exchanger may be a shell-and-tube heat exchanger, including a shell side and a tube side. The shell side can receive the flow of the hydrocarbon component stream and the tube side can receive the flow of solvent-diluted stream. However, the heat exchanger type could be any kind of indirect heat exchanger in which the two heat exchange fluids do not mix and are physically separated (e.g., hairpin type, double-tube type, etc.).

However, breakage or leaking risks, from one process fluid to the other, still exist when using indirect heat exchangers. For example, leaks can occur due to vibration, corrosion, erosion, burst tubes or damaged gaskets, or improper reinstallation after maintenance or cleaning.

Implementations of the solvent recovery process include providing the heated liquid stream at a higher pressure relative to a pressure of the solvent-diluted stream in the indirect heat exchanger in order to mitigate risks and problems associated with potential leaks. Selection of the pressures may be made so as to provide a sufficient pressure difference so that any leak in between the hydrocarbon component stream and the solvent-diluted stream in the indirect heat exchanger results in the hydrocarbon component stream leaking into the solvent-diluted stream, thus avoiding solvent leakage into the hydrocarbon component stream.

In some implementations, providing the higher pressure includes pressurizing the hydrocarbon component stream above the pressure of the solvent-diluted stream, for example by pumping the hydrocarbon component stream using at least one pump upstream of the indirect heat exchanger. Referring to FIG. 2, several pumps 24, 26 may be used to provide adequate pumping of the upstream liquid stream 6, 10.

In implementations in relation to a bitumen component stream, the latter may be provided at a pressure above the pressure of the solvent-diluted bitumen stream in the indirect heat exchanger. This pressure difference between the bitumen component stream and the solvent-diluted bitumen stream depends on the acceptable safety or design margin implemented to ensure the bitumen component stream will leak into the solvent-diluted bitumen stream in case of a leak scenario. Any pressure difference greater than zero kilopascals (kPa) could be considered as an acceptable pressure difference; however, a practical range could be considered between about 100 kPa and about 1000 kPa, for example.

It should be understood that other types of heat exchangers can be used to further heat the solvent-diluted stream so as to reach an adequate temperature for the first stage separation step. For example, referring to FIG. 2, the pre-heating may include further heating the heated solvent-diluted bitumen stream 3 in a direct-fired heater 30 or another method of heating (indirect heat-exchanger, etc.) to produce a further pre-heated solvent-diluted bitumen stream 5. This pre-heating may be performed by one or more pre-heaters that could be a steam heat exchanger or use another heating medium (e.g., hot glycol).

Monitoring and Detection of Solvent Content

Even if the solvent content of the liquid component stream from the second stage separation step is in the order of trace amounts, the proposed solvent recovery techniques can make use of a supplementary stage separation step, downstream of the indirect heat exchange step, which can serve as part of a monitoring step of the solvent content of the final liquid product.

In some implementations, the process may include providing a supplementary or third solvent-bitumen separation unit downstream of the indirect heat exchanger to receive a cooled liquid component stream and produce a liquid product stream. It should be understood that the supplementary solvent-bitumen separation unit may be referred to as the third stage flash vessel 20 illustrated on FIG. 2 and included in the third stage separation step 104 illustrated on FIG. 1, for some implementations.

In some implementations, the supplementary solvent-bitumen separation unit may be operatively connected to a monitoring assembly which monitors operation of the supplementary solvent-bitumen separation unit. The monitoring assembly enables detection of abnormal behavior in the monitored operation that could be, for example, the result of a potential leak from the solvent-diluted hydrocarbon stream into the liquid component stream in the indirect heat exchanger. Such solvent leaks may be more likely to occur in the event the pressure difference between the bitumen component stream used as heating medium and the solvent-diluted bitumen stream is such that the solvent-diluted bitumen stream can leak into the bitumen component stream. Increased solvent content of the feed stream to the supplementary stage separation stage can also result from other upstream process conditions, such as upsets in the upstream separation vessels.

Figure 3:
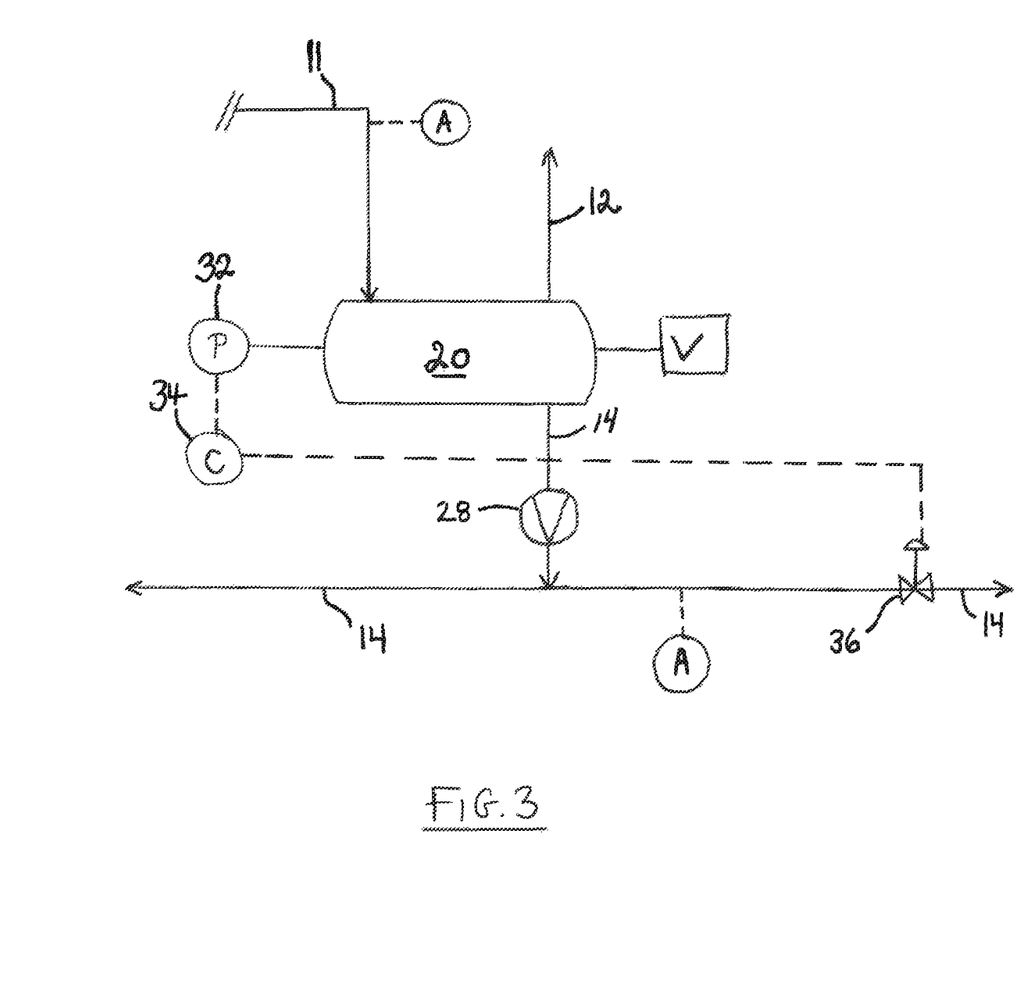
FIG. 3 is another flow diagram of a third separation stage of an SRU including a monitoring assembly.

Referring to FIG. 3, the monitoring assembly may include a pressure transducer 32 configured to monitor an operating pressure in the third solvent-bitumen separation unit 20 (which can also be referred to as a gas-liquid separation unit for some implementations). The pressure transducer 32 is operatively connected to a controller 34, such as an SIS logic solver. If the monitored pressure is above a given pressure threshold, due to the vaporization of an increased amount of solvent in the liquid component stream 11, the controller 34 can actuate a valve assembly 36 to close, thus avoiding supplying off-specification bitumen product to downstream pipeline transportation, storage facilities or processing facilities. In some implementations, an analyzer (A), such as an in-line residual solvent-in-bitumen ratio analyzer, can be used to monitor of the operation of the supplementary solvent-bitumen separation unit.

In some implementations, the supplementary solvent-bitumen separation unit may be a flash drum. The process may include operating the supplementary flash drum 20 at a vacuum pressure less than atmospheric pressure. Optionally, the pressure threshold may be selected to correspond to downstream storage facilities, pipeline or processing facilities regulations. For example, the pressure threshold may be between an absolute pressure of 70 kPaa (i.e., 70 kPaa) and 90 kPaa, optionally 75 kPaa to 80 kPaa, when monitoring separation of the residual solvent from the bitumen component stream in the supplementary flash drum 20. Alternatively, a leak of the solvent-diluted stream 2 into the bitumen component stream 11 in the upstream indirect heat exchanger 22 may be detected when monitoring an increase of the operating pressure above the controlled vacuum pressure of the flash drum.

It should be understood that monitoring of the operation of the supplementary solvent-bitumen separation unit is not limited to monitoring the pressure, but may also include monitoring an in-line residual solvent-in-bitumen ratio analyzer (A) of the bitumen component stream 11 or liquid product stream 14, monitoring the vacuum pumping load of a vacuum system downstream (V) of the supplementary solvent-bitumen separation unit, or a combination thereof, in order to detect an undesirable increase in solvent content.

In some scenarios, the controller 34 may be configured to actuate the valve assembly 36 upon receiving a signal of an increased residual solvent-in-bitumen ratio indication from the in-line residual solvent in bitumen ratio analyzer (A) monitoring the bitumen component stream 11 or liquid product stream 14, or of an increased vacuum pumping load above a load threshold.

Figure 4:
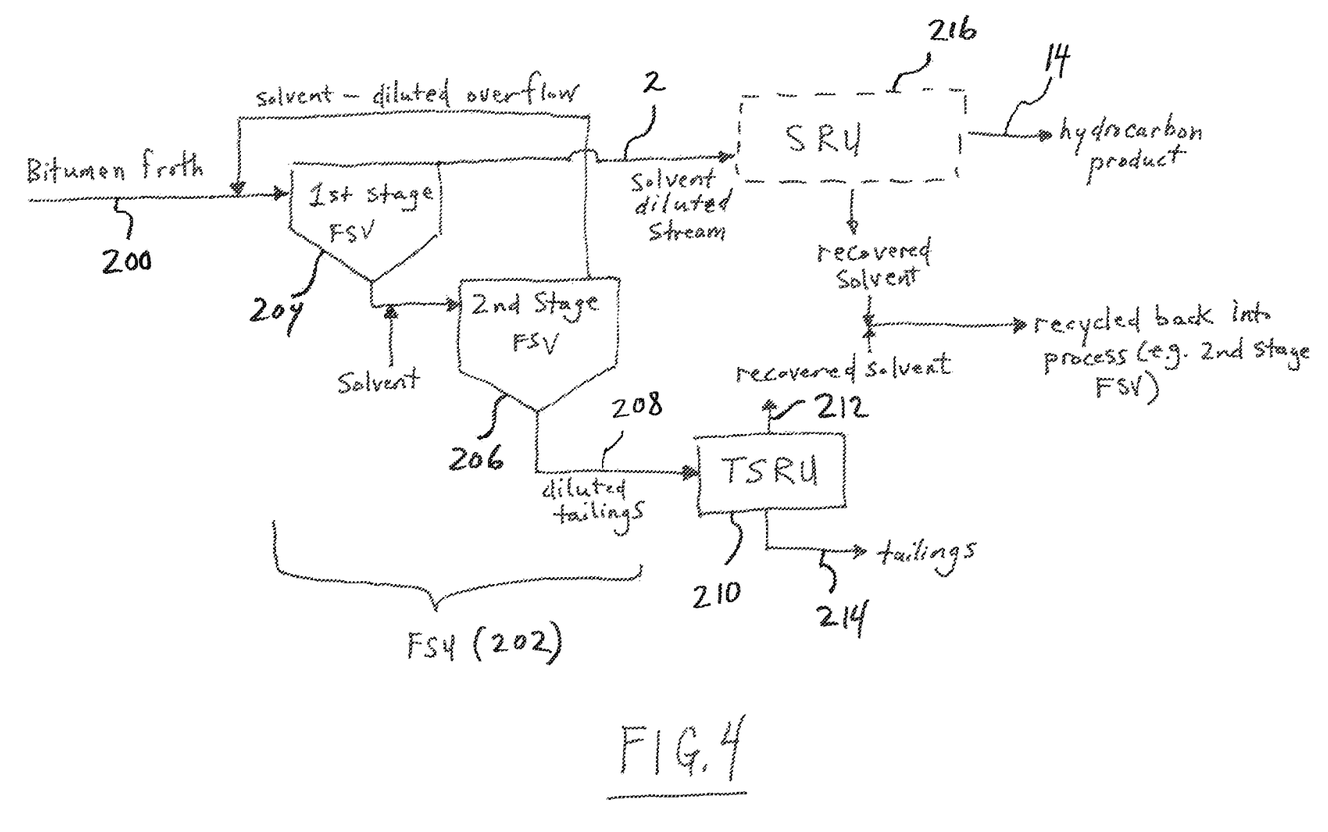
FIG. 4 is another flow diagram of a process for producing a bitumen or hydrocarbon product.

Referring now to FIG. 4, an overall process of treating bitumen froth to produce a hydrocarbon product is illustrated. The bitumen froth 200, which can come from a primary separation vessel (PSV) of an oil sands processing operation, can be fed to a froth separation unit (FSU) 202 which can include first and second stage froth separation vessels (FSV) 204, 206. Solvent can be added to facilitate separation. The solvent can be paraffinic or naphthenic. When paraffinic solvent is use, the solvent to bitumen ratio can be such that asphaltene flocs form and precipitate in the FSU, thereby producing a partially upgrading solvent diluted stream 2. Diluted tailings 208 are formed by the FSU 202, and that stream is sent to a tailings solvent recovery unit (TSRU) 210 to recover solvent 212 and produce a solvent depleted tailings 214. The solvent diluted stream 2 from the overflow of the first stage separation vessel 204 can be used as at least part of the feed for the SRU 216, which can have various features as described herein. The SRU produces the product 14 and recovered solvent 218. The recovered solvent streams 218, 212 can be recycled back into the FSU 202, e.g., as part of the main solvent fed into the underflow of the first stage FSV 204. It should be noted that various process configurations can be used to produce the hydrocarbon product from bitumen froth or a similar emulsion. For example, the FSU can include two or three vessels, which can be arranged in a counter-current configuration, with solvent addition at various locations, and the TSRU can also include one or more vessels operated using various approaches. The bitumen froth 200 can be derived from surface mining, in situ recovery operations, and/or other bitumen sources.

It should also be understood that the valve assembly may include one or more upstream valves that may be actuated to reduce or prevent the feed of solvent-diluted hydrocarbon stream to the first stage separation step while the solvent content in the liquid product stream has not reached an acceptable level. In some implementations, the liquid product stream can be recycled back into the SRU, the feed into the SRU can be completely shut off, and the units of the SRU can be operated in hot recycle mode. In such a hot recycle mode, solvent can be added to the stream fed into the first stage separation vessel in order to simulate the solvent-to-bitumen weight ratio that would occur in the normal solvent-diluted hydrocarbon stream. This type of turn-down mode can facilitate maintenance and monitoring activities such that the SRU can gradually be brought back to normal operation. For instance, once the liquid product stream contains an acceptably low solvent content, the solvent-diluted hydrocarbon stream may be reintroduced gradually into the SRU.

The invention claimed is:

1. A process for producing a bitumen product stream from a solvent-diluted bitumen stream resulting from solvent-assisted separation of a bitumen froth, the process comprising:
   separating the solvent-diluted bitumen stream in a first stage flash vessel to produce a first stage flash vessel bottoms stream and a first stage recovered solvent stream;
   separating at least a portion of the first stage flash vessel bottoms stream in a second stage separation column to produce a bitumen component stream and a second stage recovered solvent stream;
   cooling the bitumen component stream to produce a cooled bitumen component stream and
   separating the cooled bitumen component stream in a third stage flash vessel to produce a bitumen product stream and a third stage recovered solvent stream.

2. The process of claim 1, further comprising pre-heating the solvent-diluted bitumen stream before the first stage flash vessel to produce a heated diluted bitumen stream.

3. The process of claim 2, wherein the pre-heating is performed so as to heat the solvent-diluted bitumen stream up to between around 100° C. and around 140° C., and operating the second stage separation column is performed to produce the bitumen component stream at a temperature between about 190° C. and about 250° C.

4. The process of claim 2, wherein the pre-heating comprises using at least a portion of the bitumen component stream as a heating stream in an indirect heat exchanger.

5. The process of claim 4, wherein the pre-heating comprises further heating the heated solvent-diluted bitumen stream in a direct-fired heater to produce a pre-heated solvent-diluted bitumen stream.

6. The process of claim 1, wherein the cooling comprises using the solvent-diluted bitumen stream as a cooling stream in an indirect heat exchanger.

7. The process of claim 1, wherein the separation of the bitumen component stream in the third stage flash vessel is operated at a vacuum pressure less than atmospheric pressure.

8. The process of claim 1, further comprising monitoring a third stage pressure in the third stage flash vessel for a pressure increase due to the vaporization of an increased amount of solvent in the bitumen component stream, and preventing the bitumen product stream from being sent to downstream storage facilities, pipeline or processing facilities if the increase of pressure is monitored within the third stage flash vessel.

9. A process for producing a bitumen product stream from a solvent-diluted heavy hydrocarbon stream, the process comprising:
   pre-heating the solvent-diluted heavy hydrocarbon stream with a heating stream in an indirect heat exchanger to produce a preheated solvent-diluted heavy hydrocarbon stream;
   separating the preheated solvent-diluted heavy hydrocarbon stream in a solvent-heavy hydrocarbon separation unit to produce a recovered solvent stream and a heated liquid component stream;
   reusing at least a portion of the heated liquid component stream as the heating medium for the pre-heating step to produce a cooled liquid component stream;
   providing the heated liquid component stream at a higher pressure relative to a pressure of the solvent-diluted hydrocarbon stream in the indirect heat exchanger to prevent the solvent-diluted heavy hydrocarbon stream from flowing into the heated liquid stream via a leak; and
   deriving the bitumen product stream from the cooled liquid component stream.

10. The process of claim 9, wherein the solvent-heavy hydrocarbon separation unit comprises a first stage flash drum and a second stage separation column.

11. The process of claim 9, further comprising separating the cooled liquid component stream in a supplementary solvent-heavy hydrocarbon separation unit to produce the bitumen product stream and an additional solvent stream.

12. The process of claim 9, comprising monitoring a pressure in the supplementary solvent-heavy hydrocarbon separation unit for detecting an increase of pressure due to an increased solvent content in the cooled liquid component stream.

13. The process of claim 9, further comprising preventing the cooled liquid component stream from automatically proceeding to the downstream storage facilities, pipeline or processing facilities, if the sensed pressure is above the pressure threshold, and wherein the preventing comprises actuating a valve downstream of the supplementary solvent-heavy hydrocarbon separation unit and diverting the cooled liquid component stream back into an upstream unit.

14. The process of claim 9, wherein the solvent-diluted stream is derived from a solvent-assisted separation of a bitumen froth during oil sands ore extraction operations, and the solvent is a paraffinic solvent.

15. A process for separating a solvent-diluted hydrocarbon stream to produce recovered solvent vapour and liquid hydrocarbon product, the process comprising:
   feeding the solvent-diluted hydrocarbon stream into a solvent-hydrocarbon separation unit to produce a solvent vapour stream and a liquid component stream;
   pre-heating the solvent-diluted hydrocarbon stream in an indirect heat exchanger located upstream of the solvent-hydrocarbon separation unit using the liquid component stream and producing a cooled liquid component stream;

providing a supplementary solvent-hydrocarbon separation unit downstream of the indirect heat exchanger to receive the cooled liquid component stream and produce a liquid hydrocarbon product stream; and monitoring operation of the supplementary solvent-hydrocarbon separation unit to detect a potential leak from the solvent-diluted hydrocarbon stream into the liquid component stream in the indirect heat exchanger.

16. The process of claim 15, wherein the monitoring operation of the supplementary solvent-hydrocarbon separation unit comprises monitoring an operating pressure thereof, and wherein the leak is detected when detecting an increase of the operating pressure above a pressure threshold.

17. The process of claim 15, wherein the monitoring operation of the supplementary solvent-hydrocarbon separation unit comprises monitoring an in-line residual solvent-in-bitumen ratio of the liquid component stream.

18. The process of claim 17, wherein an in-line analyzer is used to monitor the residual solvent-in-bitumen ratio, and wherein the leak is detected when the in-line residual solvent-in-bitumen ratio is above a residual solvent-in-bitumen ratio threshold.

19. The process of claim 15, wherein the supplementary solvent-hydrocarbon separation unit is operated under vacuum pressure less than atmospheric pressure, and wherein the monitoring operation of the supplementary solvent-hydrocarbon separation unit comprises monitoring a vacuum pumping load of a vacuum system operatively coupled to the supplementary solvent-bitumen separation unit, wherein the leak is detected when detecting an increase in the vacuum pumping load of the vacuum system above a load threshold.

20. A process for producing a bitumen product stream from a solvent-diluted bitumen stream resulting from solvent-assisted separation of a bitumen froth, the process comprising:

pre-heating a solvent bitumen stream to produce a heated diluted bitumen stream, wherein the pre-heating comprises using at least a portion of the bitumen component stream as a heating stream in an indirect heat exchanger and wherein the pre-heating further comprises heating the heated diluted bitumen stream in a direct-fired heater to produce a pre-heated solvent-diluted bitumen stream;

separating the pre-heated solvent-diluted bitumen stream in a first stage flash vessel to produce a first stage flash vessel bottoms stream and a first stage recovered solvent stream;

separating at least a portion of the first stage flash vessel bottoms stream in a second stage separation column to produce a bitumen component stream and a second stage recovered solvent stream;

and separating the bitumen component stream in a third stage Hash vessel to produce a bitumen product stream and a third stage recovered solvent stream.

21. A process for producing a bitumen product stream from a solvent-diluted bitumen stream resulting from solvent-assisted separation of a bitumen froth, the process comprising:

separating the solvent-diluted bitumen stream in a first stage flash vessel to produce a first stage flash vessel bottoms stream and a first stage recovered solvent stream;

separating at least a portion of the first stage flash vessel bottoms stream in a second stage separation column to produce a bitumen component stream and a second stage recovered solvent stream; and separating the bitumen component stream in a third stage flash vessel at a vacuum pressure less than atmospheric pressure to produce a bitumen product stream and a third stage recovered solvent stream.

22. A process for producing a bitumen product stream from a solvent-diluted bitumen stream resulting from solvent-assisted separation of a bitumen froth, the process comprising:

separating the solvent-diluted bitumen stream in a first stage flash vessel to produce a first stage flash vessel bottoms stream and a first stage recovered solvent stream;

separating at least a portion of the first stage flash vessel bottoms stream in a second stage separation column to produce a bitumen component stream and a second stage recovered solvent stream;

separating the bitumen component stream in a third stage flash vessel to produce a bitumen product stream and a third stage recovered solvent stream; and monitoring a third stage pressure in the third stage flash vessel for a pressure increase due to vaporization of an increased amount of solvent in the bitumen component stream, and preventing the bitumen product stream from being sent to downstream storage facilities, pipeline or processing facilities if the increase of pressure is monitored within the third stage flash vessel.

* * * * *

UNITED STATES PATENT AND TRADEMARK OFFICE
CERTIFICATE OF CORRECTION

| | | |
|---|---|---|
| PATENT NO. | : 10,519,379 B2 | Page 1 of 1 |
| APPLICATION NO. | : 15/637947 | |
| DATED | : December 31, 2019 | |
| INVENTOR(S) | : Jeffrey Lindmark et al. | |

It is certified that error appears in the above-identified patent and that said Letters Patent is hereby corrected as shown below:

In the Claims

At Column 14, Line 10, substitute "Hash" with -- flash --.

Signed and Sealed this
Eighth Day of September, 2020

Andrei Iancu
*Director of the United States Patent and Trademark Office*